(12) United States Patent
Hahn et al.

(10) Patent No.: US 6,880,301 B2
(45) Date of Patent: Apr. 19, 2005

(54) PIVOTAL AND TRANSLATIONAL DOCK LEVELER LIP

(75) Inventors: Norbert Hahn, Franklin, WI (US); Reinhard E. Sander, Wauwatosa, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 09/799,756

(22) Filed: Mar. 6, 2001

(65) Prior Publication Data

US 2002/0124491 A1 Sep. 12, 2002

(51) Int. Cl.[7] .......................... E04D 13/18; E04H 14/00
(52) U.S. Cl. ...................... 52/173.1; 52/173.2; 52/174; 414/401; 414/584; 414/537; 14/69.5; 14/71.1
(58) Field of Search ............................ 52/173.1, 173.2, 52/174; 414/401, 584, 537; 14/69.5, 71.1

(56) References Cited

U.S. PATENT DOCUMENTS

| | | | |
|---|---|---|---|
| 1,993,261 A | | 3/1935 | Colgate |
| 2,714,735 A | | 8/1955 | Watson |
| 2,993,219 A | | 7/1961 | Pennington |
| 3,388,413 A | * | 6/1968 | Clarke ............................. 14/71 |
| 3,728,753 A | * | 4/1973 | Beckwith et al. ............. 14/71.3 |
| 3,763,514 A | * | 10/1973 | Bishop ......................... 14/71.3 |
| 3,786,530 A | * | 1/1974 | Le Clear ...................... 14/71.3 |
| 3,835,497 A | * | 9/1974 | Smith .......................... 14/71.3 |
| 3,967,337 A | * | 7/1976 | Artzberger ................... 14/71.5 |
| 4,020,517 A | * | 5/1977 | Waddell ....................... 14/71.5 |
| 4,065,824 A | * | 1/1978 | Ellis et al. .................... 14/71.3 |
| RE30,104 E | * | 10/1979 | Burnham ...................... 14/71.3 |
| 4,365,374 A | * | 12/1982 | Bennett ........................ 14/71.7 |
| 4,402,100 A | * | 9/1983 | Slusar .......................... 14/71.3 |
| 4,531,248 A | * | 7/1985 | Swessel et al. .............. 14/71.3 |
| 4,662,021 A | * | 5/1987 | Hagen et al. ................ 14/71.3 |

(Continued)

FOREIGN PATENT DOCUMENTS

| | | |
|---|---|---|
| CH | 585661 | 3/1977 |
| DE | 2634652 | 2/1978 |
| DE | 2952658 | 7/1981 |
| DE | 3412564 | 10/1985 |
| EP | 0 342 476 A2 | 11/1989 |
| FR | 2 723 360 | 5/1995 |
| GB | 1 469 899 | 10/1975 |

OTHER PUBLICATIONS

International Search Report from PCT/US02/06511.

*Primary Examiner*—Carl D. Friedman
*Assistant Examiner*—Christy Green
(74) *Attorney, Agent, or Firm*—Hanley, Flight & Zimmerman, LLC

(57) ABSTRACT

A dock leveler, for bridging the gap between a loading dock platform and a vehicle at the dock, includes an adjustably overlapping lip and ramp that provide a traffic surface of variable length to accommodate situations where there is only a limited amount of space for the lip to rest on the rear of the vehicle. The lip pivots and translates from a stored, pendant orientation to an operative orientation with a range of extended positions. In the stored position, one edge of the lip protrudes above the deck to inhibit material handling equipment from accidentally driving over the edge of the deck when a vehicle is not parked adjacent the dock leveler.

24 Claims, 10 Drawing Sheets

U.S. PATENT DOCUMENTS

| | | | | |
|---|---|---|---|---|
| 4,744,121 A | * | 5/1988 | Swessel et al. | 14/71.7 |
| 4,776,052 A | * | 10/1988 | Delgado et al. | 14/71.3 |
| 4,823,421 A | * | 4/1989 | Kleynjans et al. | 14/71.3 |
| 4,865,507 A | * | 9/1989 | Trickle | 414/401 |
| 4,920,598 A | * | 5/1990 | Hahn | 14/71.1 |
| 5,040,258 A | * | 8/1991 | Hahn et al. | 14/71.3 |
| 5,088,143 A | * | 2/1992 | Alexander | 14/69.5 |
| 5,157,801 A | * | 10/1992 | Alexander | 14/71.3 |
| 5,311,628 A | * | 5/1994 | Springer et al. | 14/71.1 |
| 5,323,503 A | * | 6/1994 | Springer | 14/71.3 |
| 5,333,339 A | * | 8/1994 | Larsen | 14/71.1 |
| 5,343,583 A | * | 9/1994 | Cook | 14/71.3 |
| 5,392,481 A | * | 2/1995 | Hageman | 14/71.1 |
| 5,452,489 A | * | 9/1995 | Gelder et al. | 14/69.5 |
| 5,544,381 A | * | 8/1996 | Alexander | 14/71.7 |
| 5,832,554 A | * | 11/1998 | Alexander | 14/71.1 |
| 6,006,389 A | * | 12/1999 | Alexander | 14/71.1 |
| 6,065,172 A | * | 5/2000 | Swessel | 14/71.7 |
| 6,081,954 A | * | 7/2000 | Palmersheim et al. | 14/69.5 |
| 6,085,375 A | * | 7/2000 | Holm | 14/71.7 |
| 6,112,353 A | * | 9/2000 | Winter | 14/71.3 |
| 6,205,721 B1 | | 3/2001 | Ashelin et al. | |
| 6,370,719 B1 | * | 4/2002 | Alexander | 14/71.1 |
| 6,405,397 B1 | * | 6/2002 | Alexander | 14/69.5 |

\* cited by examiner

PIVOTAL AND TRANSLATIONAL DOCK LEVELER LIP

BACKGROUND OF THE INVENTION

1. Field of the Invention

The subject invention generally relates to dock levelers, and more specifically, to dock levelers having a lip extension.

2. Description of Related Art

Dock levelers are used to compensate for height differences between a loading dock platform and an adjacent bed of a truck or trailer. A typical dock leveler includes a deck, also known as a ramp or dockboard, which is pivotally hinged along its back edge to vary the height of its front edge. An extension plate, or lip, extends outward from the deck's front edge to span the gap between the rear of the truck bed and the front edge of the deck. The lip is usually moveable between a retracted, stored position (i.e., clear of the truck) to an extended, operative position. In the extended, operative position, the lip extends from the deck's front edge and rests upon the truck bed to form a bridge between the two. This allows personnel and material handling equipment to readily move on and off the vehicle during loading and unloading operations.

With some dock levelers, the lip moves linearly, as disclosed in U.S. Pat. No. 6,081,954 and German Patent DE2800128A1. The linear movement allows varying the extent to which the front edge of the lip overlaps the vehicle bed. A variable overlap can be useful when cargo rests particularly near the rear edge of the vehicle bed, and thus limits the bed's available floor space upon which the front edge of the lip may rest. In such cases, the operator may move the lip linearly up against the cargo. But this could create dangerously insufficient overlap between the lip and the truck bed; as such an approach relies on the operator's judgment. Too small of an overlap could result in loss of contact between the lip and the bed—potentially allowing the deck to fall. Another dock leveler, disclosed in German Patent DE19612135A1, has a lip fixed relative to its deck with side bumpers that move along a plane. However, all of these devices in their stored positions (also known as a cross-traffic position where an upper surface of the deck is flush with the adjacent floor) provide no significant obstruction to a forklift or other material handling equipment that might accidentally drive off the front edge of the deck when a vehicle is not present at the dock.

However, some dock levelers include a pivotal lip with a rear edge that protrudes above the deck when the deck is in its cross-traffic position, thereby providing an obstruction to material-handling equipment. During loading or unloading operations, a front edge of the lip pivots out over the rear edge of the truck bed, while the rear edge of the lip pivots down to overlap the deck, thus bridging the gap between the deck and the truck bed while removing the obstruction to material-handling equipment. But the extension of the lip is generally fixed, so the lip is unable to adjust to situations where there is limited floor space at the rear of a vehicle bed.

Another dock leveler, disclosed in U.S. Pat. No. 4,920,598, provides a pivoting lip with some sliding movement when the lip hangs generally pendant. In the stored, cross-traffic position, the sliding movement allows the lip to protrude above the deck. The protruding portion of the lip thus creates an obstruction that helps inhibit equipment from accidentally driving off the front edge of the deck. When the deck is raised from the cross-traffic position, the sliding movement allows the lip 30 to translate relative to the deck to a position where the rear or top edge of the lip no longer forms an obstruction. The lip can then be extended to a position where the rear edge of the lip abuts the front edge of the deck, thus preventing the lip from sliding back. Thus, cargo at the very back of the truck bed may interfere with a fully extended lip. So in such cases, the lip is moved to a substantially pendant position below the deck, and the deck is either moved to its cross-traffic position or to a below-dock position. In the cross-traffic position the deck is generally flush with the adjacent floor of the dock platform, and in the below-dock position, the deck is below the adjacent floor. In either case, the lip does not rest on the bed of the truck nor does it protrude above the deck. This allow some material-handling equipment, such as fork lift trucks, to drive onto the deck and reach out with their forks to place or remove loads from the very rear of the truck bed without interference from the lip. However, the gap between the deck and the truck bed (due to the lip being pendant) is generally not meant to be driven across. Thus, the gap inhibits some material handling equipment, such as pallet jacks, from loading or unloading cargo from the very rear of the vehicle bed.

SUMMARY OF THE INVENTION

In order to provide a dock leveler with a traffic surface of variable length, a dock leveler includes a lip that pivots and translates from a stored, pendant position to various operative, extended positions.

In some embodiments, a dock leveler includes a lip moveably coupled to a deck, such that when the deck is in a cross-traffic position, the lip protrudes above the deck to obstruct material handling equipment from accidentally driving over the edge of the deck when a vehicle is not parked adjacent the dock leveler.

In some embodiments a dock leveler includes a deck and a lip that together provide a traffic surface of variable length by having a variable overlap between the lip and the deck.

In some embodiments, a dock leveler includes deck and a lip with the lip being pivotal relative to the deck about a substantially horizontal axis and being further rotatable about a second axis generally perpendicular to the horizontal axis, whereby a forward edge of the lip can lie at various angles relative to the horizontal axis.

In some embodiments, a dock leveler includes a manually operated switch installed a significant distance away from a lip of the dock leveler to help encourage an operator to stay off the leveler while the lip moves from a pendant position to an extended position.

In some embodiments, a dock leveler includes a deck with a recess in which a lip may lie to help align an upper surface of the lip to an upper surface of the deck.

DESCRIPTION OF THE PREFERRED EMBODIMENT

Figure 1:
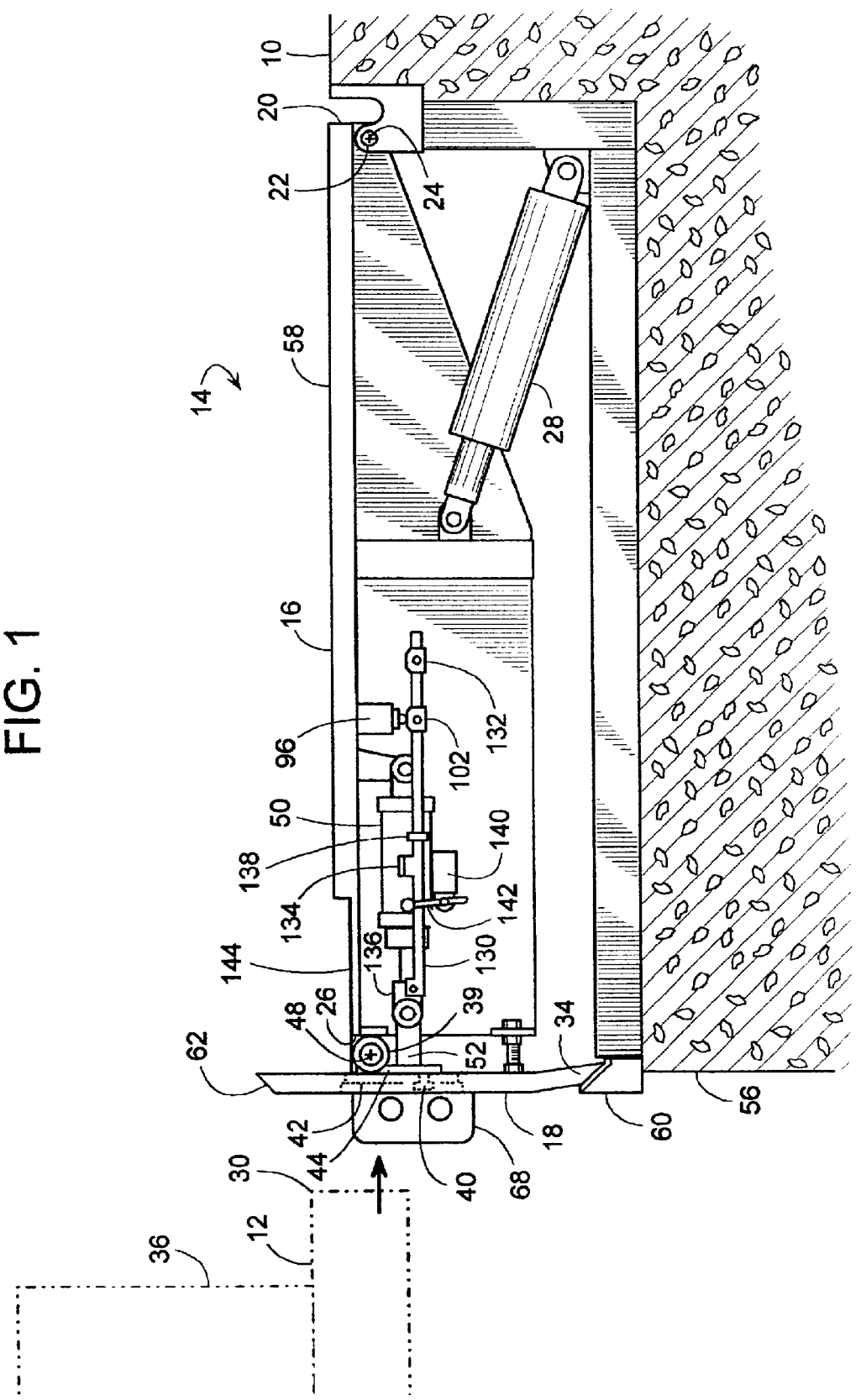
FIG. 1 is a side view of one exemplary embodiment of a dock lever in its standby position with its lip in a stored, pendant position.

To compensate for height differences between a loading dock platform 10 and the bed of a vehicle 12 (e.g., truck, trailer, etc.) and to form a bridge between the two, a dock leveler 14 includes a pivotal ramp 16 with a moveable lip extension 18, as shown in FIGS. 1–8. Along a rear edge 20 of ramp 16, a hinge 22 allows ramp 16 to pivot about a generally horizontal axis 24 to adjust the height of a front edge 26 of ramp 16. A ramp actuator 28 (e.g., fluid cylinder, diaphragm, bellows, spring, motor-driven actuator, etc.) can then move front edge 26 to the same general elevation as a rear edge 30 of vehicle 12.

To bridge the gap between rear edge 30 of vehicle 12 and front edge 26 of ramp 16, lip 18 is moveably coupled to front edge 26. Lip 18 is interconnected to the front edge 26 to provide a variety of positions and types of motion relative to the ramp. For example, lip 18 is pivotable relative to the ramp 16 between a stored, or pendant, orientation (as in FIG. 1) wherein the lip 18 is disposed generally perpendicular to ramp 16; and an operative orientation wherein lip 18 is pivoted so as to form a generally coplanar extension of the ramp 16. It is in the operative orientation that lip 18 forms a bridge between the ramp 16 and the rear edge 30 of the vehicle 12. Movement of the lip 18 to the operative orientation thus creates a traffic surface 32 (FIGS. 6 and 7) extending from a front edge 34 of lip 18 to rear edge 20, which allows personnel and material handling equipment to readily move on and off the vehicle during loading and unloading operations.

According to one aspect of the invention, the length of traffic surface 32 can vary. That is, with lip 18 in the operative orientation, the amount of overlap between the rear portion of the lip 18 and the front portion of the ramp 16 may be different for different operational circumstances. Indeed, the nature of the interconnection between lip 18 and ramp 16 is adapted to provide this adjustability of the length of traffic surface 32 based on the operational circumstances, as will be discussed in detail below.

In some embodiments, lip 18 is coupled to ramp 16 by way of a sliding connection that includes a series of studs 40 extending through a corresponding series of slots 42 in lip 18. Studs 40 are screwed into or otherwise fastened to a hinge plate 44 of a hinge 39. Hinge plate 44 can be one continuous plate or a series of individual plate segments, with each segment carrying one of studs 40. A slip-fit between studs 40 and slots 42 allows the relative sliding motion, while the heads on studs 40 prevent lip 18 and hinge plate 44 from separating. Hinge 39, in turn, pivotally couples plate 44 to ramp 16 to provide lip 18 with pivotal motion about a substantially horizontal axis 48 for certain operational circumstances, and to provide lip 18 with a fixed reference point for a more complex translating/rotational motion for other operational circumstances, as discussed below.

Figure 2:
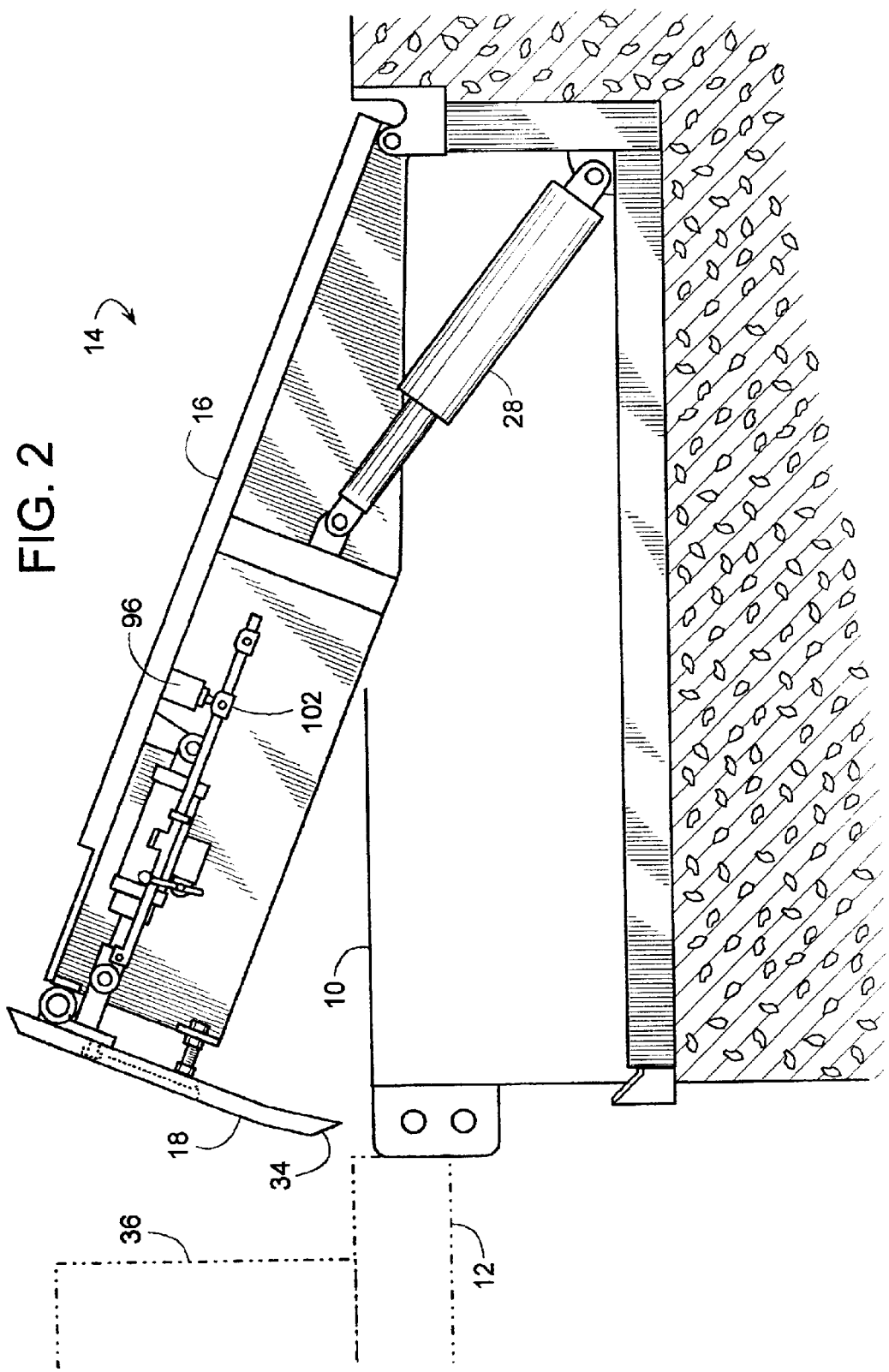
FIG. 2 shows the dock leveler of FIG. 1 with its ramp having risen above the bed of a vehicle while the leveler's lip hangs in a pendant orientation relative to the ramp.

When the lip 18 is in the pendant orientation of FIGS. 1 and 2, the sliding connection allows the lip 18 to slide relative to the ramp 16 between a stored, pendant position (in which the lip 18 extends above the ramp 16 to form an obstruction to material handling equipment that might otherwise accidentally drive of the front edge of the ramp 16) as in FIG. 1, and a retracted, pendant position in which the rear edge of the lip 18 does not extend above the upper surface of the ramp 16, as in FIG. 2. According to the embodiment, movement of lip 16 from the stored, pendant position to the retracted, pendant position is caused by relative movement between the ramp 16 and lip 18. That is, lip 18 remains substantially fixed as ramp 16 is raised to the FIG. 2 position. The sliding connection between the lip 18 and ramp 16 facilitates this movement. In this regard, the sliding connection between lip 18 and ramp 16 is similar to the one disclosed in U.S. Pat. No. 4,920,598, which is specifically incorporated by reference herein.

Figure 3:
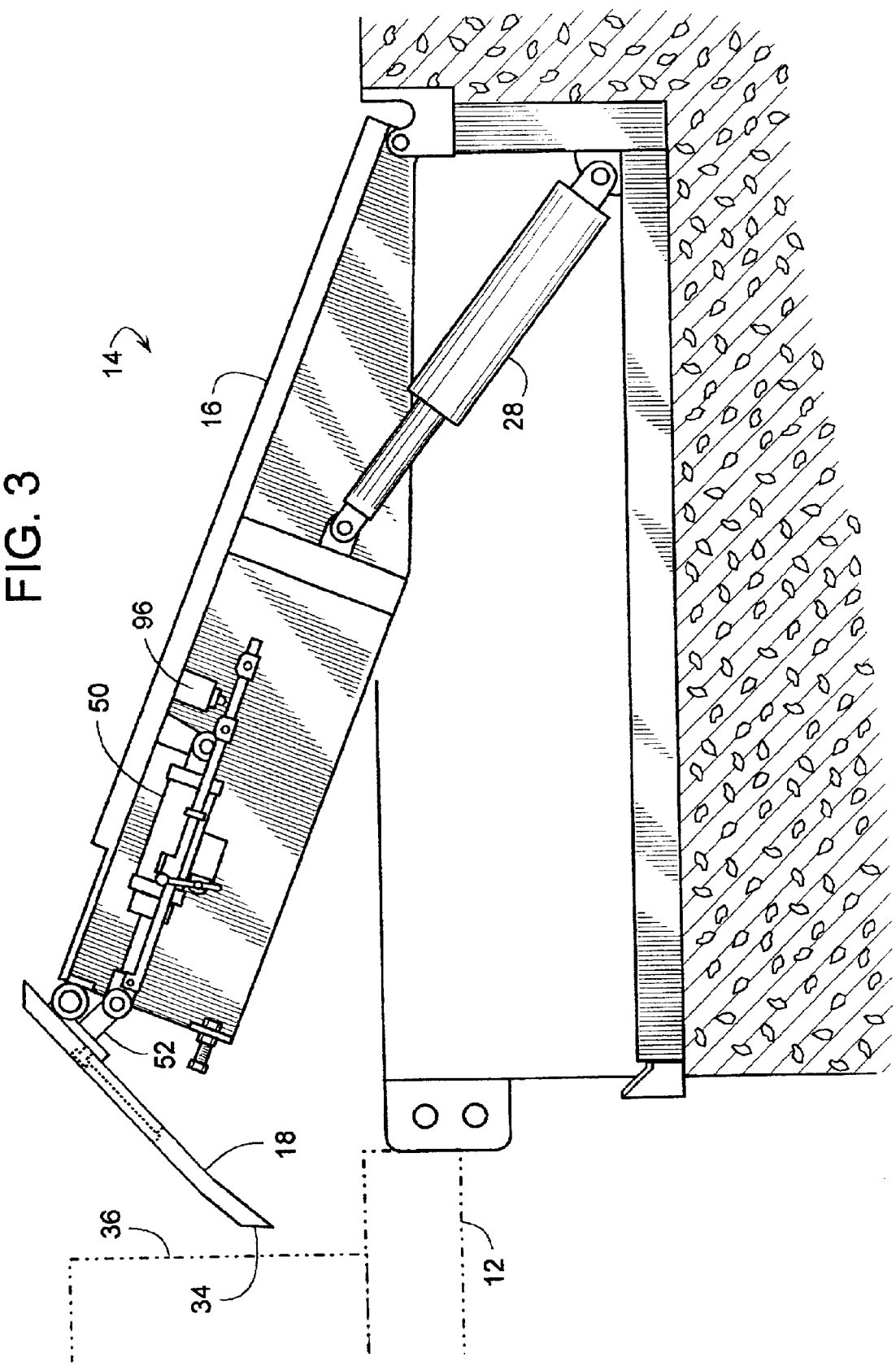
FIG. 3 is the same as FIG. 2, but with the lip pivoted outward to an intermediate orientation.
Figure 8:
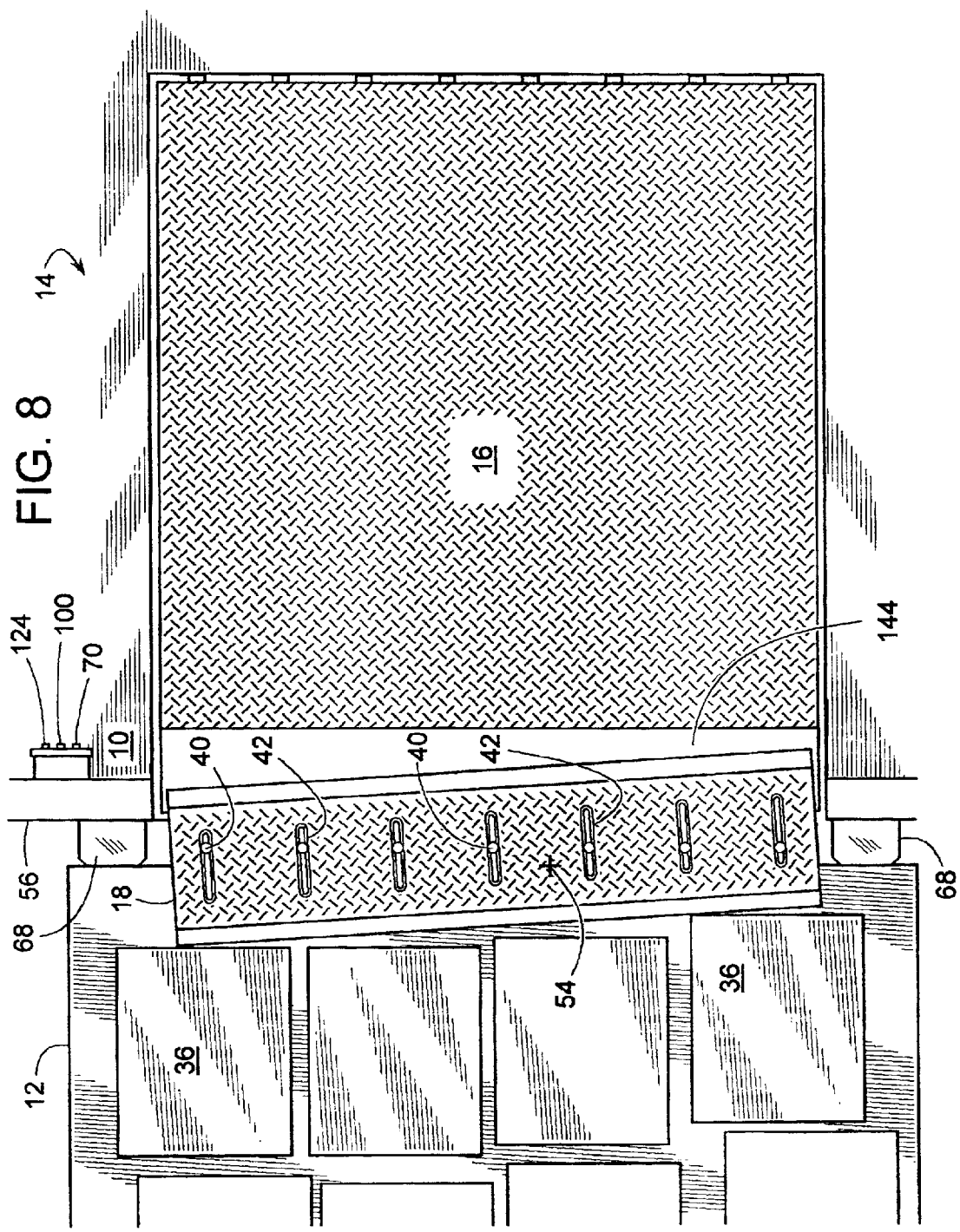
FIG. 8 is a top view of FIG. 6 with the lip having rotated about an axis perpendicular to a horizontal axis.

In distinction to the '598 patent, however, the sliding connection according to this embodiment also provides for a sliding translation of the lip 18 relative to the ramp 16 for the full range of lip orientations between the pendant orientation and the operative orientation. For example, in the operative orientation according to this embodiment, rotation of the lip about axis 54 allows lip 18 to adjust to situations where vehicle 12 and/or load 36 are disposed at a slight angle to dock face 10, as shown in FIG. 8. Such movement does not appear to be possible in the context of the '598 patent as the rear edge of the lip abuts a vertical surface on the ramp when the lip is in the operative orientation (FIG. 3 of '598). Perhaps more importantly, the interconnection between the lip 18 and ramp 16 in this embodiment is also distinct from that shown in the '598 patent, as the interconnection here provides for sliding movement of the lip relative to the ramp 16 at intermediate orientations between the pendant and operative orientations. It is this movement that allows the amount of overlap between the rear portion of lip 18 and the front portion of deck 16 to be different for varying operational circumstances, and thus to adjust the length of the traffic surface 32 depending on those circumstances. To provide this enhanced functionality relative to the '598 patent, the position of slots 42 in lip 18 and the height of hinge 39 relative to traffic surface 32 are different to allow lip 18 to slide relative to ramp 16 throughout the range of lip orientations. More specifically, slots 42 are shifted further away from a rear edge 62 of lip 18 and hinge 39 is raised to be closer to traffic surface 32.

The operational advantages provided by this structure will now be discussed in greater detail, particularly in regard to the ability of the length traffic surface 32 to be adjusted depending on operational circumstances. In one operational circumstance, the vehicle being unloaded has ample floor space at the rear to receive the lip 18. In this instance, the leveler according to this embodiment would be operated conventionally. Ramp 16 would be raised until studs 40 engaged the tops of slots 42 and raised lip 18 out of lip keepers 60. Once the front edge of lip were high enough for front edge 34 to clear the bed of the vehicle, the lip would be rotated fully to the operative orientation. To pivot lip 18 about axis 48, a lip actuator 50 (e.g., fluid cylinder, diaphragm, bellows, spring, motor-driven actuator, etc.) is coupled to a lug 52 that rigidly extends from hinge plate 44. As actuator 50 extends, lip 18 pivots outward. When the lip is fully rotated to the operative orientation, the ramp 16 and now generally co-planar lip 18 can be lowered onto the bed of vehicle 12, to facilitate the unloading or loading process. In this circumstance, the length 38 of traffic surface 32 is at its maximum, as the lip in the operative orientation has its most minimal overlap with ramp 16 (see FIG. 7). That is, lip 18 is in an extended position in its operative orientation.

Figure 9:
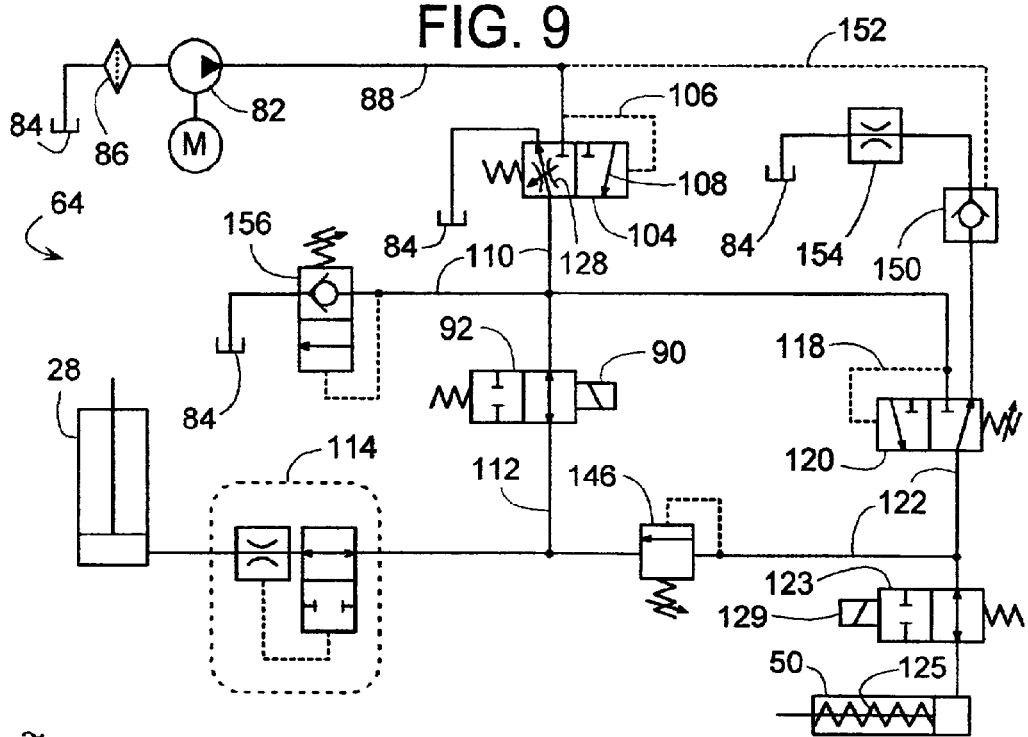
FIG. 9 is a hydraulic schematic used in operating the dock leveler of FIG. 1.
Figure 10:
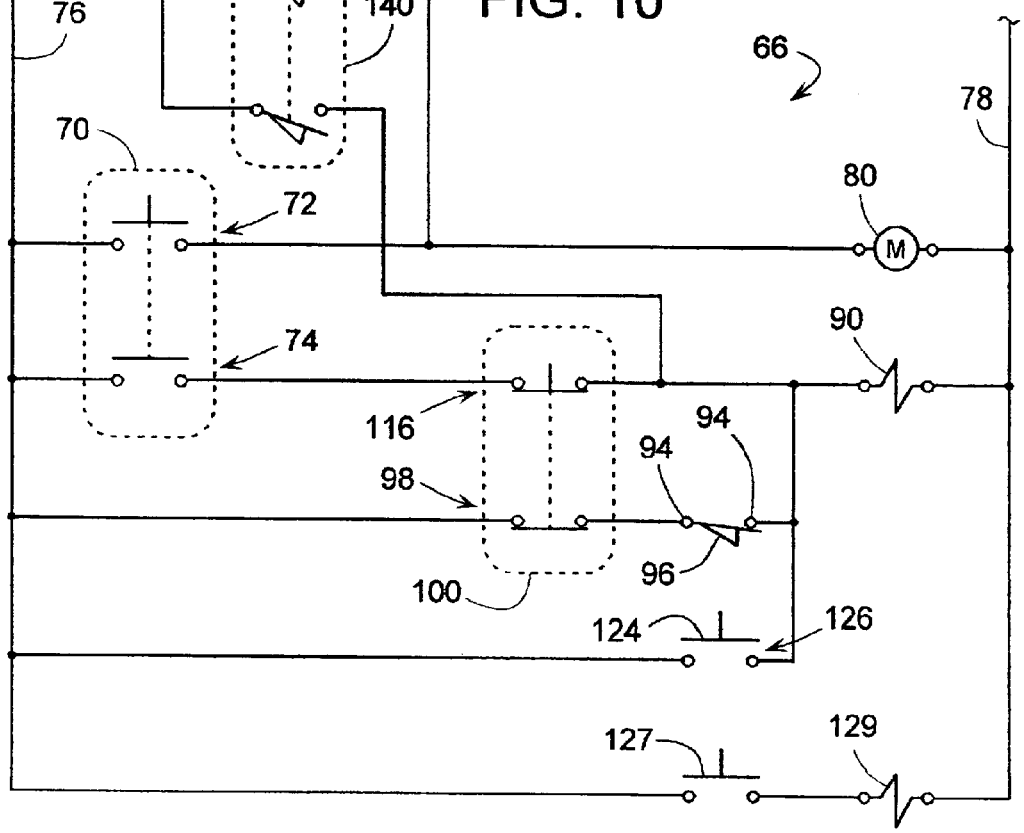
FIG. 10 is an electrical schematic associated with the hydraulic schematic of FIG. 9.

A hydraulic circuit 64 of FIG. 9 and an electrical circuit 66 of FIG. 10 can control the operation of dock leveler 14. A typical operating sequence would begin with dock leveler 14 in its standby position of FIG. 1. In this position, ramp 16 is in its cross-traffic position where an upper surface 58 of ramp 16 is generally flush with the adjacent floor of dock 10. Lip 18 is stored in a generally pendant orientation with front edge 34 of lip 18 supported by lip keepers 60 and with a rear edge 62 of lip 18 protruding above upper surface 58 of ramp 16. Edge 62 protruding above surface 58 creates an obstruction to material handling equipment that might otherwise accidentally drive over the front edge 26 of ramp 16 when vehicle 12 is not present at dock 10. With dock leveler 14 in its standby position, the operating states of the components of circuits 64 and 66 are as shown in FIGS. 9 and 10.

Once vehicle 12 backs up against a set of bumpers 68 of dock 10, a pump switch 70 can be actuated to raise ramp 16, as shown in FIG. 2. Pump switch 70 includes two normally opened contacts 72 and 74. With supply voltage across lines 76 and 78, contacts 72 energize a motor relay coil 80 of a conventional motor starter (not shown) that starts a motor-driven hydraulic pump 82. Pump 82 draws hydraulic fluid from a tank 84 and through a filter 86 to deliver pressurized fluid to a hydraulic fluid line 88. A set of contacts 94 of a limit switch 96 and one set of normally closed contacts 98 of a lip switch 100 energizes a solenoid 90, which maintains the open position of a solenoid valve 92 (e.g., a two-way, two-position, solenoid-actuated, spring return valve). Contacts 94 of limit switch 96 are normally open but held closed by a first cam 102 when lip 18 is in the pendant orientation relative to ramp 16, as shown in FIGS. 1 and 2. With pump 82 running, hydraulic fluid in line 88 pressurizes a pilot line 106 to shift a shuttle valve 104 (e.g., a three-way, two-position, pilot-operated, spring-return valve) from its normal position of FIG. 9. Pressurized hydraulic fluid then passes in series through line 88, passage 108 of valve 104, a line 110, open solenoid valve 92, a line 112, and velocity fuse 114 and into actuator 28, which raises ramp 16. Velocity fuse 114 simply controls the reverse flow from ramp actuator 28 to stop movement of ramp 16 in the event of an unexpected adverse operating condition.

After ramp 16 rises high enough for front edge 34 of lip 18 to clear the bed of vehicle 12, as shown in FIG. 2, an operator can extend lip 18 by actuating lip switch 100 while maintaining contacts 72 and 74 of pump switch 70 closed. Lip switch 100 being actuated opens contacts 98 and 116 to de-energize solenoid 90, which closes solenoid valve 92. With solenoid valve 92 closed, pressure builds in line 110 and a pilot line 118 to shift a sequence valve 120 (e.g., a three-way, two-position, pilot-operated, spring-return valve) that is set to shift at a predetermined pressure greater than that which is necessary to lift ramp 16. Sequence valve 120 shifting from its normal position of FIG. 9 delivers pressurized fluid from line 110, through a line 122, through a normally open solenoid valve 123, and to lip actuator 50, which starts pivoting lip 18 outward.

Figure 7:
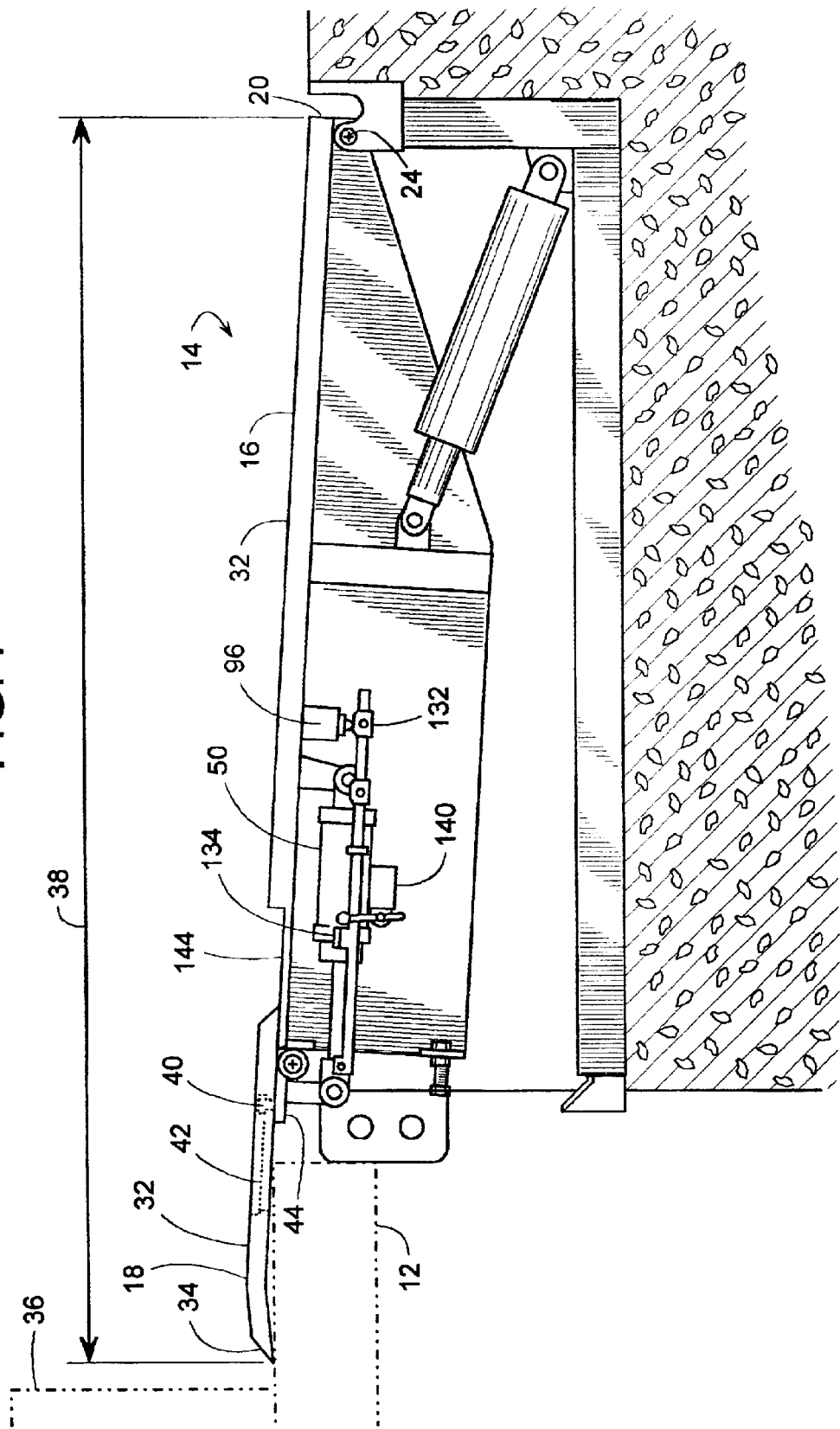
FIG. 7 shows the dock leveler of FIG. 1 with its lip at an operative orientation and a fully extended position.

Lip 18 can be pivoted fully to the operative orientation if load 36 leaves sufficient floor space at the rear of vehicle 12, as shown in FIG. 7. When vehicle 12 has no load obstructing the full extension of lip 18, dock leveler 14 can be operated in a conventional manner similar to other dock levelers that fully extend their lip. However, if load 36 leaves limited floor space at the rear of vehicle 12, lip 18 can be partially pivoted relative to ramp 16 to an intermediate orientation to just reach over what space is available, as shown in FIG. 3. With lip 18 in a partially pivoted orientation, cam 102 releases switch 96 to close solenoid 90. This creates a condition at which ramp 16 can be lowered to set the partially pivoted lip down on top of the vehicle bed.

Figure 4:
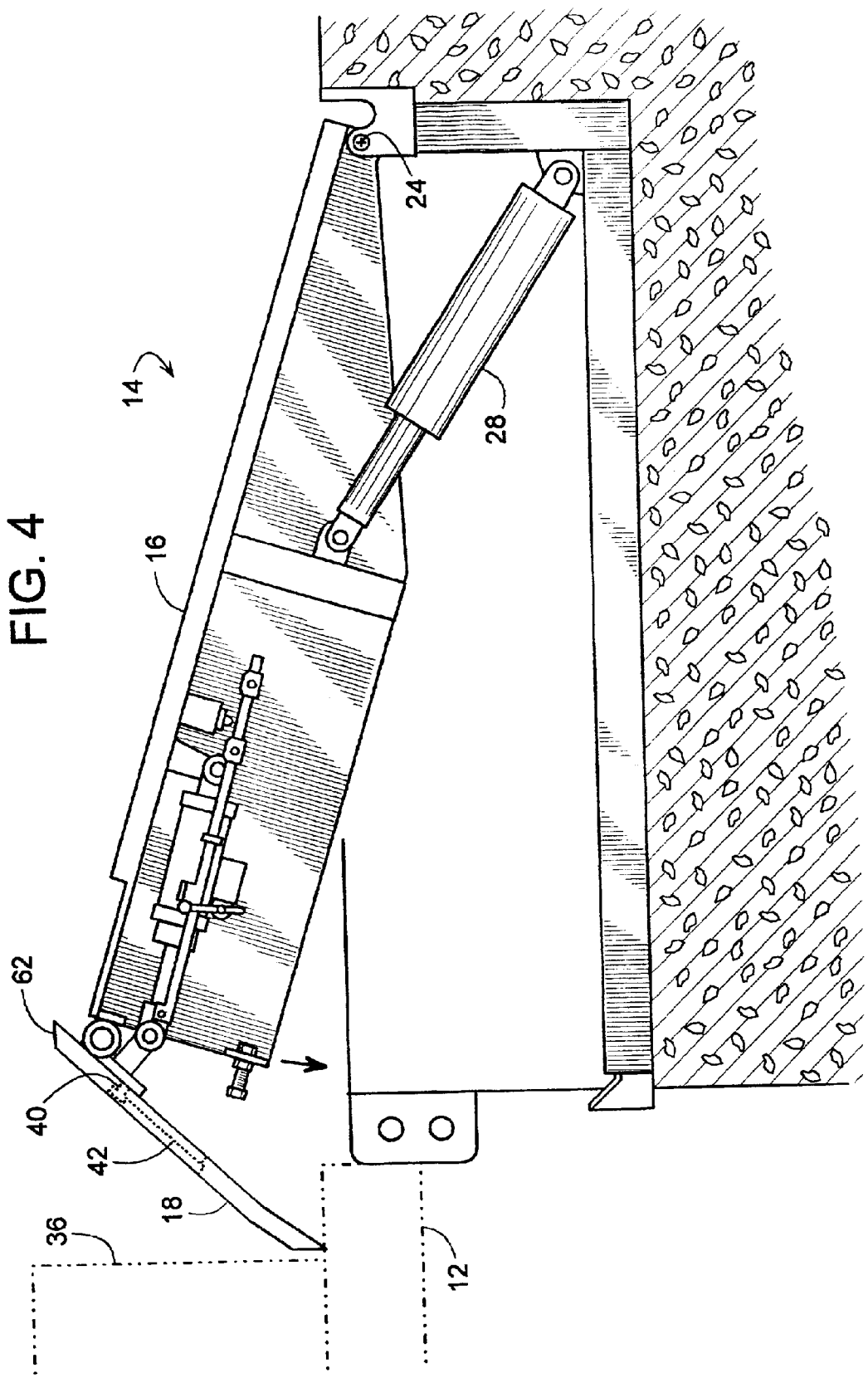
FIG. 4 is the dock leveler of FIG. 1 touching its lip to a vehicle.

To lower ramp 16 from its position of FIG. 3 to that of FIG. 4, pump switch 70 is released to open contacts 72 and 74, while a ramp descent switch 124 is actuated. Actuating switch 124 closes its normally open contacts 126 to energize solenoid 90 and thus open valve 92. With pump 82 turned off and solenoid valve 92 open, the weight of ramp 16 pushing against ramp actuator 28 forces hydraulic fluid to drain from actuator 28 to tank 84. Due to an adjustable flow restriction 128 in shuttle valve 104, ramp 16 descends at a controlled rate, as hydraulic fluid flows in series through velocity fuse 114, line 112, open solenoid valve 92, and flow restriction 128. Ramp descent switch 124 is preferably of a spring-return style where switch 124 needs to be manually attended to keep its contacts 126 closed. This helps ensure that an operator is unable to obstruct the movement of lip 18 with any portion of his body, provided switch 124 is remotely located relative to lip 18. In other words, the operator would have to make an intentional effort to hold the switch down and simultaneously obstruct the movement of lip 18. Otherwise, when tip 34 is against vehicle 12, an operator might inadvertently obstruct the downward rotation of rear edge 62 as ramp 16 descends.

Figure 5:
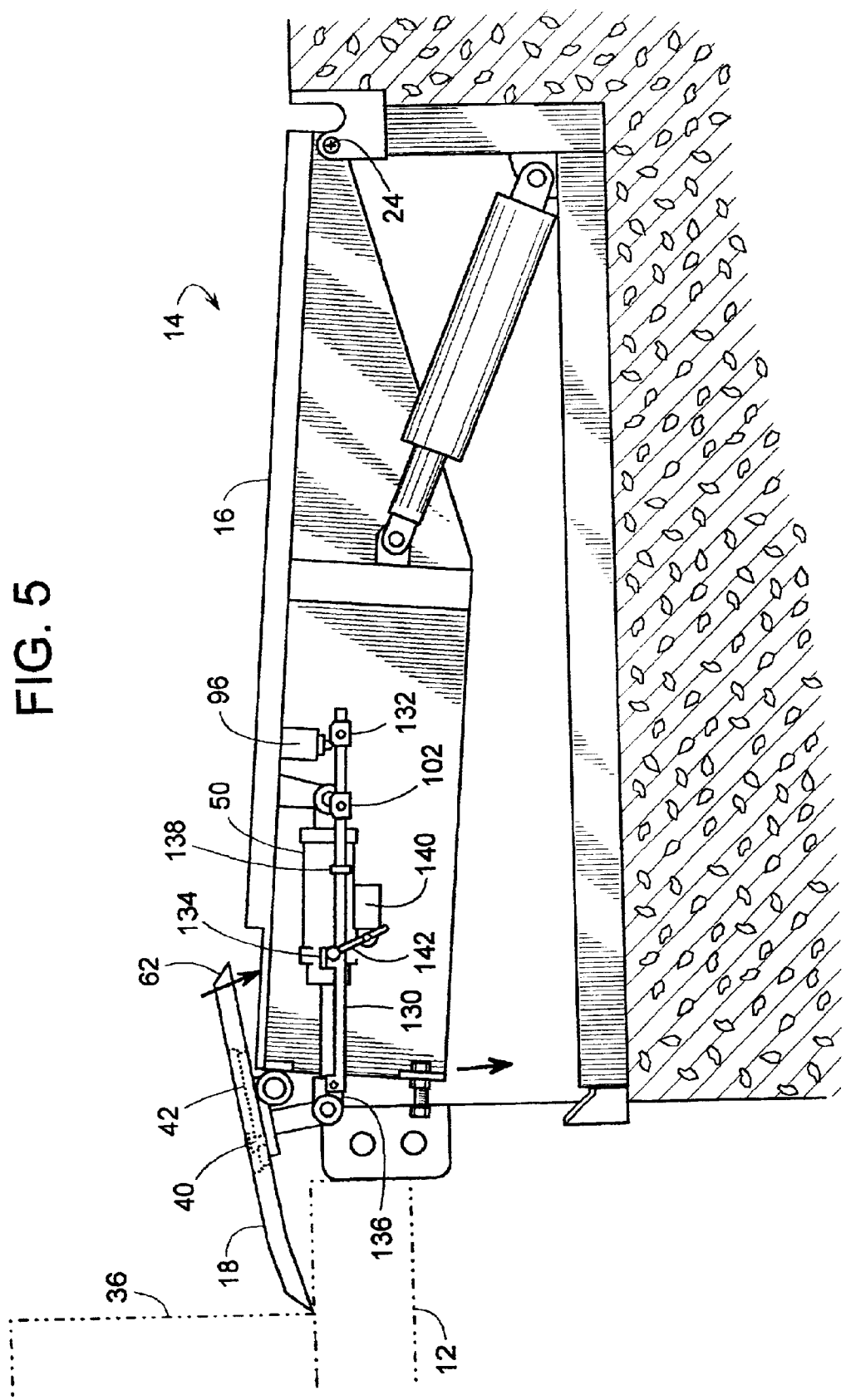
FIG. 5 shows the dock leveler of FIG. 1 simultaneously resting a portion of the lip upon the vehicle, pivoting the ramp downward about an axis, and moving another portion of the lip toward the axis.

To compensate for limited available floor space caused by load 36 being particularly near the rear of vehicle 12, rear edge 62 of lip 18 moves back relative to ramp 16, as ramp 16 descends from its position of FIG. 4 to that of FIG. 5. To do this, load 36, being an obstruction to further extension of lip 18, forces rear edge 62 of lip 18 to overlap ramp 16 as ramp 16 descends. Varying the amount of overlap adjusts length 38 of traffic surface 32 or the distance between axis 24 and the rear of load 36. In some embodiments, the movement between lip 18 and ramp 16 is, in part, a sliding motion guided by studs 40 sliding within slots 42. While rear edge 62 of lip 18 moves toward axis 24, lip 18 continues rotational movement.

Figure 6:
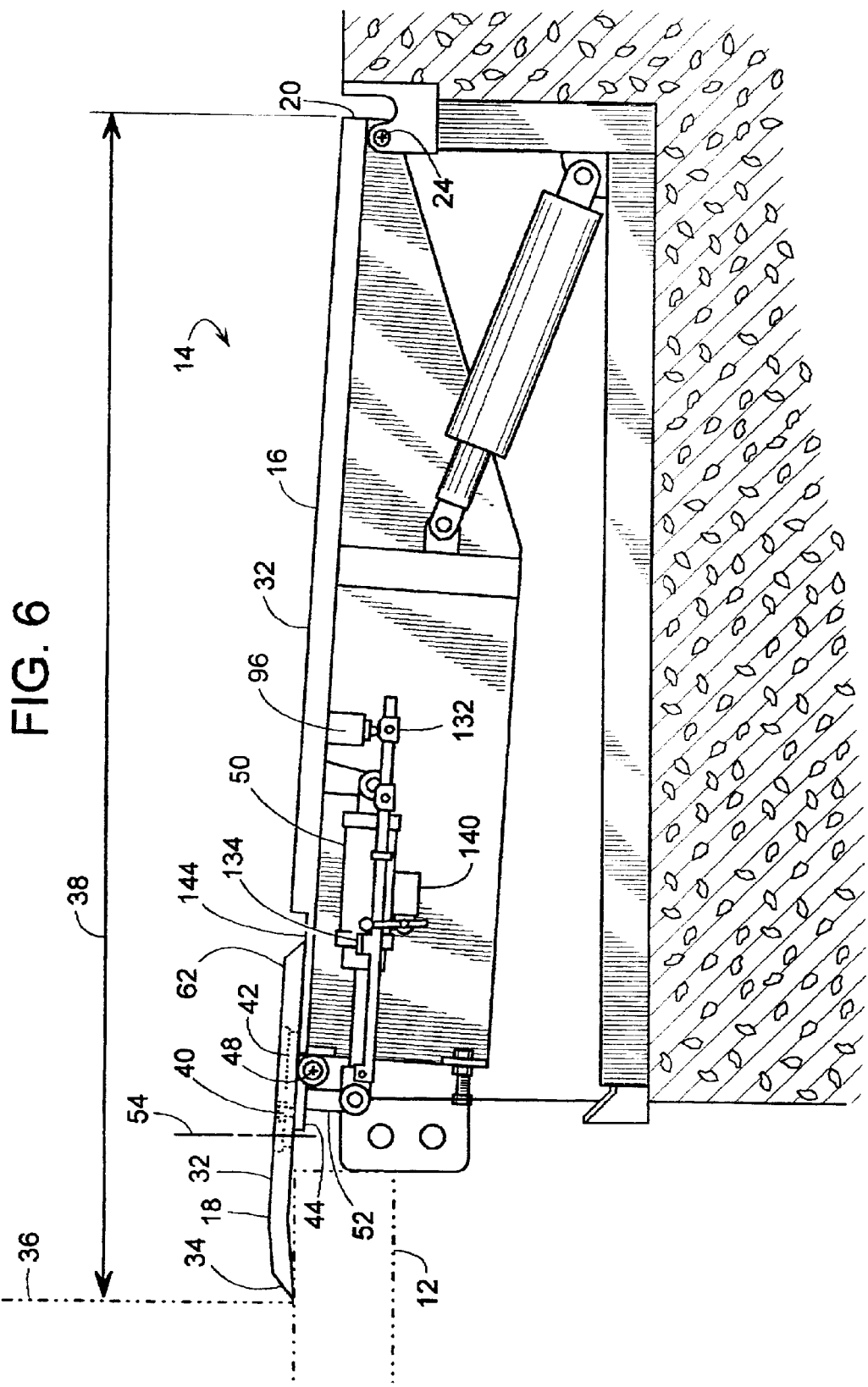
FIG. 6 shows the dock leveler of FIG. 1 with its lip at an operative orientation and a partially extended position.

Once lip 18 moves upward (relative to ramp 16) beyond its position shown in FIG. 5 and into the operative orientation of FIG. 6 (either by powered movement or because of deck descent), ramp descent switch 124 can be released. To sense the pivoted positions of lip 18, an arm 130 carrying cams 102, 132 and 134 has one end fixed to a rod end 136 of lip actuator 50 while an elongated portion of arm 130 slides within a guide 138 fixed relative to the cylinder of actuator 50. As rod end 136 extends and retracts, arm 130 moves cams 102 and 132 across limit switch 96 and moves cam 134 across a roller arm actuator 142 of a limit switch 140. As lip 18 moves from its position of FIG. 5 to that of FIG. 6, cam 132 actuates limit switch 96. Cam 132 closing limit switch 96 keeps solenoid valve 92 open (regardless of switch 124) by energizing solenoid 90 through the closed contacts 94 of limit switch 96 and the normally closed contacts 98 of lip switch 100. With cam 132 holding the contacts of limit switch 96 closed, solenoid valve 92 remains open while dock leveler 14 is in the position shown in FIG. 6. Solenoid valve 92 being open allows ramp 16 to "float" with the incidental up and down movement of vehicle 12, as vehicle 12 is being loaded or unloaded of its cargo.

To minimize any impedance to material handling equipment traveling between lip 18 and ramp 16, in some embodiments, ramp 16 includes a pocket or recess 144 into which lip 18 lies when in the operative orientation. In other embodiments; however, lip 18 simply overlays surface 58 of ramp 16 without a recess.

After completing the loading or unloading of vehicle 12 and vehicle 12 departs the dock area, ramp 16 descends under its own weight, as cam 132 actuating limit switch 96 keeps solenoid valve 92 open. Once ramp 16 bottoms out (e.g., ramp 16 abuts some mechanical stop), the pressure in line 112 drops virtually to zero, as actuator 28 no longer supports the weight of ramp 16. The absence of significant pressure in line 112 allows the hydraulic fluid in line 122 (which is pressurized by the weight of lip 18 pushing against lip actuator 50) to release through a pressure relief valve 146, thereby pivoting lip 18 downward by the weight of lip 18 and/or by a biasing force of compression spring 125 in cylinder 50. Although slight downward movement of lip 18 causes cam 132 to release limit switch 96, cam 134 trips limit switch 140 just before cam 132 disengages limit switch 96. Cam 134 closing the contacts of limit switch 140 restarts pump 82 and keeps solenoid valve 92 open. Thus, ramp 16 begins rising due to pressurized hydraulic fluid entering ramp actuator 28 upon flowing in series through fluid line 88, line 110, solenoid valve 92, line 112 and velocity fuse 114.

Meanwhile, lip 18 continues pivoting downward by way of hydraulic fluid draining from lip actuator 50 to tank 84 upon flowing in series through normally open valve 123, line 122, a pilot-operated check valve 150 (held open by a pilot line 152 being pressurized by line 88), and a flow restrictor 154. The upward movement of ramp 16 and the relative downward movement of lip 18 continue until lip 18 achieves the pendant orientation.

At that point, cam 134 releases limit switch 140 just after cam 102 trips limit switch 96. This turns pump 82 off as the contacts of limit switch 140 and pump switch 70 are open. Yet, cam 102 tripping limit switch 96 continues to energize solenoid 90 of valve 92 through closed contacts 98 of lip switch 100 and the closed contacts 94 of limit switch 96. Thus, ramp 16 descends to its standby position of FIG. 1, as hydraulic fluid escapes from ramp actuator 28 by flowing in series through velocity fuse 114, line 112, open solenoid valve 92, and flow restriction 128 of shuttle valve 104.

Figure 11:
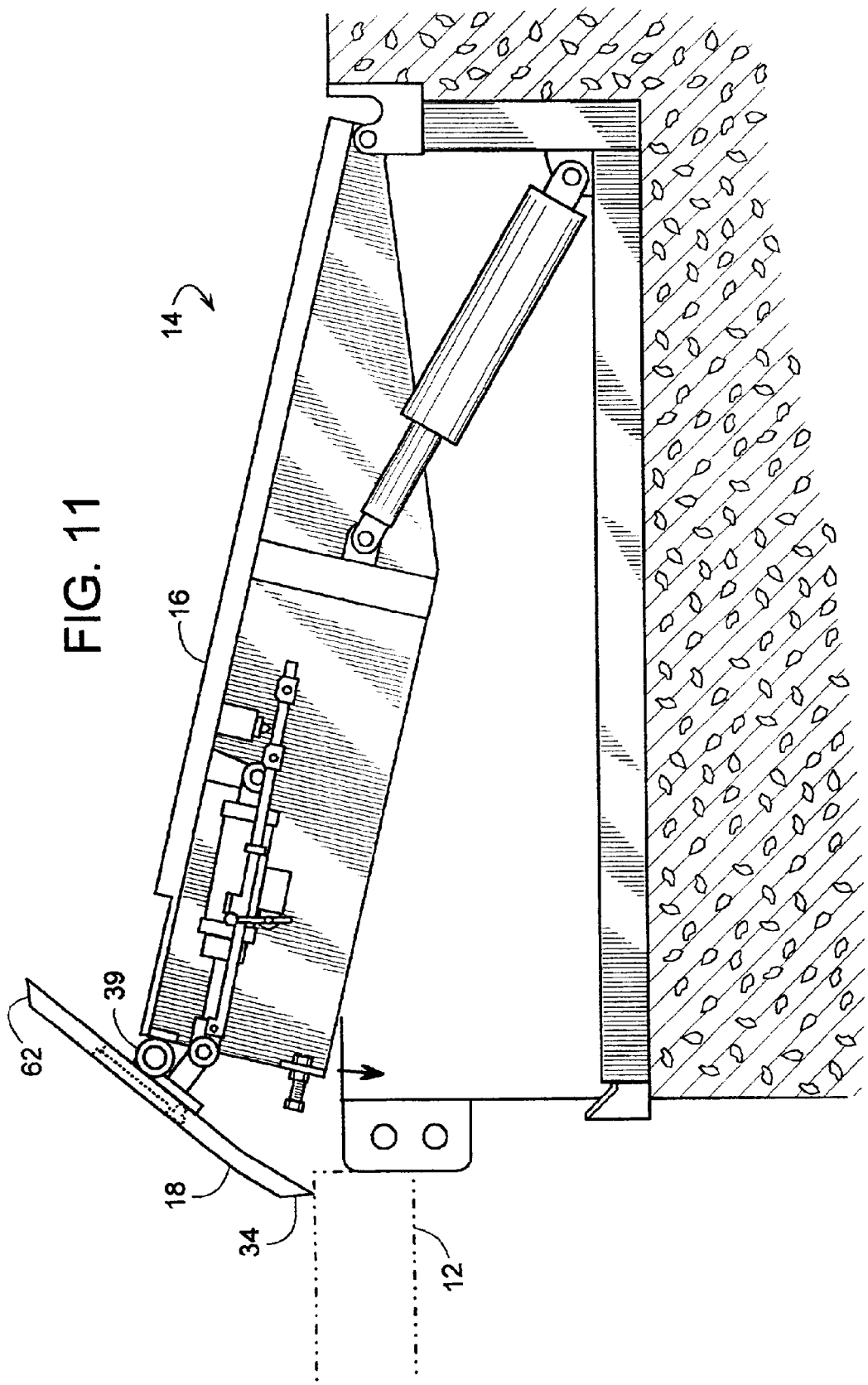
FIG. 11 shows the dock leveler of FIG. 1 with its lip pivotally fixed to force sliding motion between the lip and the deck as the deck descends.

When wanting to place the last load on the end of vehicle 12, lip 18 may need to be slid back without the aid of a load already in place to help push lip 18 back. To do this, ramp 16 and lip 18 are first moved to the position of FIG. 3. From there, dock leveler 14 can be lowered to the position of FIG. 11 by actuating ramp descent switch 124 and a lip-lock switch 127 at the same time. Lip-lock switch 127 energizes a solenoid 129 to close valve 123, which helps prevent lip 18 from pivoting in either direction. Thus, as ramp 16 descends due to switch 124 opening solenoid valve 92, lip 18 is forced to slide back as front edge 34 abuts vehicle 12. Once lip 18 is slid back, liplock switch 127 can be released, so that further downward movement of ramp 16 can force rear edge 62 of lip 18 to pivot downward until dock leveler 14 is in the position of FIG. 6 (but without load 36 already in place).

Although the invention is described with respect to a preferred embodiment, modifications thereto will be apparent to those skilled in the art. For example, a pressure relief valve 156, as shown in FIG. 9, can be added to line 110 to limit the maximum pressure in the hydraulic system. Therefore, the scope of the invention is to be determined by reference to the claims that follow.

We claim:

1. A dock leveler adapted to engage a vehicle, comprising:
   a ramp; and
   a lip pivotally coupled to the ramp about a substantially horizontal axis and slidably coupled to the ramp to provide movement of the lip relative to the ramp from a first position wherein the ramp and the lip overlap to form a traffic surface having a first length to a second position where the traffic surface has a second length different from the first length.

2. The dock leveler of claim 1, wherein the lip is pivotally and slidably coupled to the ramp via a hinge plate pivotally attached to the ramp with the lip being slidingly attached to the hinge plate.

3. The dock leveler of claim 1, wherein the lip is moveable relative to the ramp between an operative orientation in which the lip is adapted to engage the vehicle and a stored pendant position, wherein the lip extends further above the ramp in the stored pendant position than when the lip is in the operative orientation.

4. The dock leveler of claim 3, wherein the lip is moveable relative to the ramp between the stored pendant position and a receded pendant position with the lip being substantially below the ramp in the receded pendant position.

5. The dock leveler of claim 4, further compromising a switch disposed at a remote location relative to the lip, wherein the switch being manually unattended inhibits the lip from moving fully to the operative orientation.

6. The dock leveler of claim 1, wherein the lip is further rotational about an axis perpendicular to the substantially horizontal axis.

7. The dock leveler of claim 1, wherein the ramp includes an upper surface that defines a recess, wherein the lip is moveable to an operative orientation with one edge of the lip engaging the vehicle and an opposing edge of the lip lying in the recess.

8. A dock leveler adapted to engage a vehicle, comprising:
   a ramp having a forward edge and a rear edge; and
   a lip pivotally and slidably coupled to the ramp, wherein the lip is moveable to place a distal edge of the lip upon the vehicle while creating a traffic surface having a first length in a first lip position relative to the ramp and a second length different from the first length in a second lip position relative to the ramp, wherein the traffic surface extends from the distal edge to the rear edge.

9. The dock leveler of claim 8, wherein the traffic surface of variable length is by virtue of the lip overlapping the ramp a variable amount.

10. The dock leveler of claim 8, further comprising a hinge disposed adjacent to the rear edge to render the ramp pivotal for raising and lowering the forward edge of the ramp.

11. The dock leveler of claim 8, wherein the lip can slide relative to the ramp.

12. The dock leveler of claim 8, wherein the lip can further rotate relative to the ramp about an axis substantially perpendicular to the substantially horizontal axis.

13. The dock leveler of claim 8, wherein the lip is selectively moveable to a stored pendant position with an appreciable portion of the lip extending above the ramp to form an obstruction and a receded pendant position with the lip being substantially non-obstructing.

14. The dock leveler of claim 8, wherein the ramp includes an upper surface that defines a recess, wherein the lip is moveable to an operative orientation with the distal edge of the lip engaging the vehicle and an opposite edge of the lip lying in the recess.

15. A dock leveler adapted to engage a vehicle, comprising;
   a ramp pivotal about a first axis;
   a lip pivotal relative to the ramp about a second axis; and
   a hinge plate coupling the lip to the ramp, the hinge plate being pivotally coupled to the ramp to allow the lip to pivot from a pendant orientation to an operative orientation and being slidably coupled to the lip to allow the lip to be moved between a fully extended position and a partially extended position, wherein the lip includes a distal edge adapted to engage the vehicle with a distance between the distal edge and the second axis being greater when the lip is in the operative orientation while in the fully extended position than when the lip is in the operative orientation while in the partially extended position.

16. The dock leveler of claim 15, where the lip moves from the fully extended position to the partially extended position as the ramp pivots downward.

17. The dock leveler of claim 15, wherein the lip is selectively moveable to a stored pendant position with an appreciable portion of the lip extending above the ramp to form an obstruction and a receded pendant position with the lip being substantially non-obstructing.

18. The dock leveler of claim 15, wherein the lip is further pivotal about an axis perpendicular to the second axis.

19. The dock leveler of claim 15, wherein the ramp includes an upper surface that defines a recess, wherein one edge of the lip lies in the recess when the lip is in the operative orientation.

20. The dock leveler of claim 15, wherein the lip and the ramp overlap when the lip is in the operative orientation.

21. A method of operating a dock leveler that includes a ramp rotatable about a first axis with a lip coupled to the ramp and being adapted to engage a vehicle, comprising:
   partially extending the lip about a substantially horizontal axis;
   contacting the lip to the vehicle;
   in response to contacting the lip to the vehicle, pivoting the lip during descent of the ramp; and
   simultaneously providing relative translation between the lip and the ramp to form a variable length distance between a distal edge of the lip and a rear edge of the ramp, wherein after the descent of the ramp, the lip and the ramp overlap by an overlapping length that is variable in response to an available space on the vehicle.

22. The method of claim 21, further comprising raising a portion of the lip above an upper surface of the ramp.

23. The method of claim 21, wherein the lip and the ramp create a traffic surface of variable length.

24. A dock leveler adapted to engage a vehicle, comprising:
   a ramp moveable between a stored position, a raised position, and a lowered, operative position;
   a powered ramp actuator for controlling movement of the ramp among the stored, raised, and operative positions;
   a lip having a front edge and a rear edge with the front edge being adapted to engage the vehicle and the lip being pivotally coupled to the ramp to render the lip moveable between a pendant orientation and an operative orientation, wherein the rear edge of the lip protrudes above the ramp in the pendant orientation and overlays the ramp in the operative orientation; and
   a switch coupled to control the ramp actuator, the switch having a first position wherein the ramp actuator allows the ramp to descend only when the switch is maintained in the first position, and wherein the ramp is inhibited from moving to the lowered, operative position absent an operator maintaining the switch in the first position.

* * * * *